(12) United States Patent
Taylor et al.

(10) Patent No.: US 8,700,713 B2
(45) Date of Patent: Apr. 15, 2014

(54) PICTURE PROVISIONING SYSTEM AND METHOD

(75) Inventors: Paulo Taylor, Amsterdam (NL); Jan-Joost Rueb, Amsterdam (NL); Onno Bakker, Amsterdam (NL)

(73) Assignee: eBuddy Holding B.V., Amsterdam (NL)

( * ) Notice: Subject to any disclaimer, the term of this patent is extended or adjusted under 35 U.S.C. 154(b) by 1922 days.

(21) Appl. No.: 11/637,268

(22) Filed: Dec. 11, 2006

(65) Prior Publication Data

US 2007/0136419 A1 Jun. 14, 2007

Related U.S. Application Data

(60) Provisional application No. 60/748,988, filed on Dec. 9, 2005.

(51) Int. Cl.
*G06F 15/16* (2006.01)
*H04L 12/58* (2006.01)
*H04L 29/06* (2006.01)

(52) U.S. Cl.
CPC ............... *H04L 51/00* (2013.01); *H04L 51/04* (2013.01); *H04L 51/043* (2013.01); *H04L 65/00* (2013.01)
USPC .......................................... 709/206; 709/204

(58) Field of Classification Search
CPC ................................ H04L 51/00; H04L 65/00
USPC .................................................. 709/204, 206
See application file for complete search history.

(56) References Cited

U.S. PATENT DOCUMENTS

| | | |
|---|---|---|
| 6,415,313 B1 | 7/2002 | Yamada et al. |
| 6,415,318 B1 | 7/2002 | Aggarwal et al. |
| 6,484,196 B1 | 11/2002 | Maurille |
| 6,571,234 B1 | 5/2003 | Knight et al. |
| 6,993,327 B2 | 1/2006 | Mathis |
| 7,042,879 B2 | 5/2006 | Eschbach et al. |
| 7,389,324 B2 | 6/2008 | Masonis et al. |
| 7,426,382 B2 | 9/2008 | Aerrabotu et al. |
| 7,496,379 B2 | 2/2009 | Kaplan et al. |

(Continued)

FOREIGN PATENT DOCUMENTS

| | | |
|---|---|---|
| EP | 1292071 | 9/2002 |
| WO | WO-9948011 A1 | 9/1999 |

(Continued)

OTHER PUBLICATIONS

International Search Report and Written Opinion for PCT application PCT/IB2006/004205 Search Report dated Jan. 8, 2008 10 pages.

(Continued)

*Primary Examiner* — Adnan Mirza
(74) *Attorney, Agent, or Firm* — Sheppard, Mullin, Richter & Hampton LLP

(57) ABSTRACT

A technique for image provisioning in an instant messaging (IM) environment involves storing images on a web server. The images may be made available to a low level IM client that receives instant messages from a high level IM client. The images may be, for example, avatar images, custom emoticons, or other images.

14 Claims, 12 Drawing Sheets

(56) References Cited

U.S. PATENT DOCUMENTS

| | | |
|---|---|---|
| 7,512,619 B2 | 3/2009 | Burkhardt |
| 7,523,138 B2 | 4/2009 | Gruhl et al. |
| 7,636,755 B2 | 12/2009 | Blattner et al. |
| 7,730,144 B2 | 6/2010 | Taylor et al. |
| 7,779,076 B2 | 8/2010 | Heikes et al. |
| 7,933,957 B2 | 4/2011 | Daniell |
| 8,037,212 B2 | 10/2011 | Taylor et al. |
| 8,135,774 B2 | 3/2012 | Ryabchun et al. |
| 2001/0026231 A1 | 10/2001 | Satoh |
| 2002/0063735 A1 | 5/2002 | Tamir et al. |
| 2002/0091770 A1 | 7/2002 | Takakura et al. |
| 2002/0143916 A1 | 10/2002 | Mendiola et al. |
| 2003/0028597 A1 | 2/2003 | Saimi et al. |
| 2003/0076367 A1 | 4/2003 | Bencze et al. |
| 2003/0088676 A1 | 5/2003 | Smith et al. |
| 2003/0131061 A1 | 7/2003 | Newton et al. |
| 2003/0210265 A1 | 11/2003 | Haimberg |
| 2003/0222907 A1 | 12/2003 | Heikes et al. |
| 2003/0225846 A1* | 12/2003 | Heikes et al. ............... 709/207 |
| 2004/0010808 A1 | 1/2004 | deCarmo |
| 2004/0015547 A1 | 1/2004 | Griffin et al. |
| 2004/0054646 A1 | 3/2004 | Daniell et al. |
| 2004/0054802 A1 | 3/2004 | Beauchamp et al. |
| 2004/0158609 A1 | 8/2004 | Daniell et al. |
| 2004/0158610 A1 | 8/2004 | Davis et al. |
| 2004/0185874 A1 | 9/2004 | Kim et al. |
| 2004/0221224 A1* | 11/2004 | Blattner et al. ............ 715/500.1 |
| 2004/0243941 A1* | 12/2004 | Fish ............... 715/752 |
| 2005/0038876 A1 | 2/2005 | Chaudhuri |
| 2005/0080867 A1 | 4/2005 | Malik et al. |
| 2005/0097061 A1 | 5/2005 | Shapiro et al. |
| 2005/0108341 A1 | 5/2005 | Mathew et al. |
| 2005/0114454 A1 | 5/2005 | D'Angelo et al. |
| 2005/0187781 A1 | 8/2005 | Christensen |
| 2005/0259656 A1 | 11/2005 | Dollar et al. |
| 2005/0268237 A1 | 12/2005 | Crane et al. |
| 2006/0080392 A1 | 4/2006 | Kawakami et al. |
| 2006/0095562 A1 | 5/2006 | Agarwal et al. |
| 2006/0168054 A1 | 7/2006 | Burkhart et al. |
| 2006/0248157 A1 | 11/2006 | Daniell et al. |
| 2006/0256816 A1 | 11/2006 | Yarlagadda et al. |
| 2006/0265381 A1 | 11/2006 | Altaf et al. |
| 2006/0268828 A1 | 11/2006 | Yarlagadda |
| 2006/0271630 A1 | 11/2006 | Bensky et al. |
| 2006/0277053 A1 | 12/2006 | Lobb et al. |
| 2007/0043878 A1 | 2/2007 | Carlson et al. |
| 2007/0135099 A1 | 6/2007 | Taylor et al. |
| 2007/0136419 A1 | 6/2007 | Taylor et al. |
| 2007/0168451 A1 | 7/2007 | Taylor et al. |
| 2007/0168529 A1 | 7/2007 | Taylor et al. |
| 2007/0168558 A1 | 7/2007 | Taylor et al. |
| 2007/0192479 A1 | 8/2007 | Felten |
| 2008/0182559 A1 | 7/2008 | Phyalammi et al. |
| 2009/0125591 A1 | 5/2009 | Kirkpatrick |
| 2010/0099421 A1 | 4/2010 | Patel et al. |
| 2010/0228747 A1 | 9/2010 | Taylor et al. |
| 2010/0325222 A1 | 12/2010 | Taylor et al. |

FOREIGN PATENT DOCUMENTS

| | | |
|---|---|---|
| WO | WO-0120474 A1 | 3/2001 |
| WO | WO-0143357 A2 | 6/2001 |
| WO | WO-03-056764 | 7/2003 |
| WO | WO-2004/031976 A1 | 4/2004 |
| WO | 2004079530 A2 | 9/2004 |
| WO | 2005045591 | 5/2005 |
| WO | WO2005/074588 | 8/2005 |
| WO | WO-2005/074588 A2 | 8/2005 |
| WO | WO-2006083820 A1 | 8/2006 |
| WO | WO-2007063041 A1 | 6/2007 |
| WO | WO-2007-110703 A3 | 10/2007 |
| WO | WO-2007-129143 A3 | 11/2007 |
| WO | WO-2007-129144 A3 | 11/2007 |
| WO | WO2008-072028 A3 | 6/2008 |
| WO | WO2008-072030 A3 | 6/2008 |

OTHER PUBLICATIONS

International Search Report, PCT/IB2006/004193 (mailed Jun. 24, 2008) pp. 1-3.
International Search Report, PCT/IB2006/004200 (mailed Oct. 23, 2007) pp. 1-2.
International Search Report, PCT/IB2006/004264 (mailed Jun. 30, 2008) pp. 1-3.
Office Actions mailed on Jul. 30, 2009 in co-pending U.S. Appl. No. 11/637,954, filed Dec. 11, 2006.
Office Actions mailed on Sep. 3. 2009 in co-pending U.S. Appl. No. 11/637,964, filed Dec. 11, 2006.
Office Actions mailed on Nov. 5, 2009 and May 18, 2009 in co-pending U.S. Appl. No. 11/637,316, filed Dec. 11, 2006.
Office Actions mailed on Dec. 30, 2009 and Jun. 25, 2009 in co-pending U.S. Appl. No. 11/637,514, filed Dec. 11, 2006.
International Search Report and Written Opinion for PCT application PCT/IB2006/04205 Search Report dated Jan. 24, 2008, pp. 1-10.
International Search Report and Written Opinion for PCT application PCT/IB2006/04200 Search Report dated Oct. 18, 2007, pp. 1-10.
International Search Report and Written Opinion for PCT application PCT/IB2006/04204 Search Report dated Jun. 17, 2008, pp. 1-9.
International Search Report and Written Opinion for PCT application PCT/IB2006/04193 Search Report dated Jan. 8, 2008, pp. 1-10.
International Search Report and Written Opinion for PCT application PCT/IB2006/04264 Search Report dated Jun. 23, 2008, pp. 1-11.
Co-pending U.S. Appl. No. 11/637,954, filed Dec. 11, 2006.
Co-pending U.S. Appl. No. 11/637,268, filed Dec. 11, 2006.
Co-pending U.S. Appl. No. 11/637,316, filed Dec. 11, 2006.
Notice of Allowance mailed Jan. 28, 2010, in Co-Pending U.S. Appl. No. 11/637,954, filed Dec. 11, 2006.
Non-Final Office Action mailed Sep. 3, 2009, in Co-Pending U.S. Appl. No. 11/637,964, filed Dec. 11, 2006.
Final Office Action mailed Feb. 9, 2010, in Co-Pending U.S. Appl. No. 11/637,964, filed Dec. 11, 2006.
Non-Final Office Action mailed Jun. 25, 2009, in Co-Pending U.S. Appl. No. 11/637,514, filed Dec. 11, 2006.
Final Office Action mailed Dec. 30, 2009, in Co-Pending U.S. Appl. No. 11/637,514, filed Dec. 11, 2006.
Non-Final Office Action mailed Apr. 29, 2010, in Co-Pending U.S. Appl. No. 11/637,514, filed Dec. 11, 2006.
Non-Final Office Action mailed May 18, 2009, in Co-Pending U.S. Appl. No. 11/637,316, filed Dec. 11, 2006.
Final Office Action mailed Nov. 5, 2009, in Co-Pending U.S. Appl. No. 11/637,316, filed Dec. 11, 2006.
International Search Report and Written Opinion for PCT application PCT/IB2006/004204 Search Report dated Jan. 8, 2008.
International Search Report for PCT application PCT/IB2006/04193 dated Jun. 24, 2008 (3 pages).
International Search Report for PCT application PCT/IB2006/04200 dated Oct. 23, 2007 (2 pages).
International Search Report and Written Opinion for PCT application PCT/IB2006/004204 Search Report dated Jan. 8, 2008 (11 pages).
International Search Report for PCT application PCT/IB2006/004205 dated Apr. 2, 2008 (2 pages).
Corrected International Search Report and Written Opinion for PCT application PCT/IB2006/004205 dated Apr. 4, 2008 (10 pages).
International Search Report for PCT/IB2006/04264 dated Jun. 30, 2008 (3 pages).
English abstract of WO-2003-056764 dated Jul. 10, 2003 (2 pages).
English Abstract of EP-1292071 dated Sep. 5, 2002 (1 page).
Non-Final Office Action mailed May 18, 2009 and Final Office Action mailed Nov. 5, 2009 in Co-Pending U.S. Appl. No. 11/637,316, filed Dec. 11, 2006.
Office Action mailed on Mar. 21, 2011 in co-pending U.S. Appl. No. 11/637,268, filed Dec. 11, 2006.
Office Actions mailed on Dec. 30, 2009, Jun. 25, 2009, and Apr. 29, 2010 in co-pending U.S. Appl. No. 11/637,514, filed Dec. 11, 2006.

(56) References Cited

OTHER PUBLICATIONS

Non-Final Office Action mailed Jul. 30, 2009, in Co-Pending U.S. Appl. No. 11/637,954, filed Dec. 11, 2006.
Notice of Allowance mailed Jan. 28, 2010, in Co-Pending U.S. Appl. No. 11/637,954, filed Dec. 11, 2006.
Non-Final Office Action mailed Sep. 3, 2009 and Final Office Action mailed Feb. 9, 2010, in Co-Pending U.S. Appl. No. 11/637,964, filed Dec. 11, 2006.
Office Action mailed on Apr. 20, 2011 in co-pending U.S. Appl. No. 12/774,700, filed May 5, 2010.
U.S. Appl. No. 11/637,316, filed Dec. 11, 2006.
Co-pending U.S. Appl. No. 11/637,514, filed Dec. 11, 2006.
Co-pending U.S. Appl. No. 11/637,964, filed Dec. 11, 2006.
Co-pending U.S. Appl. No. 12/721,538, filed Mar. 10, 2010.
Co-pending U.S. Appl. No. 12/774,700, filed May 5, 2010.
International Application No. PCT/US2012/000046, International Search Report and Written Opinion mailed Apr. 2, 2012.
U.S. Appl. No. 11/637,514, Final Office Action mailed Jan. 18, 2011.
U.S. Appl. No. 11/637,514, Final Office Action mailed Oct. 27, 2010.
U.S. Appl. No. 11/637,514, Notice of Allowance mailed Jun. 7, 2011.
U.S. Appl. No. 11/637,964, Non-Final Office Action mailed Jul. 27, 2010.
U.S. Appl. No. 13/165,709, Non-Final Office Action mailed Nov. 10, 2011.

* cited by examiner

300C

300D

300E

US 8,700,713 B2

PICTURE PROVISIONING SYSTEM AND METHOD

CROSS-REFERENCE TO RELATED APPLICATIONS

This Patent Application claims priority to U.S. Provisional Patent App. No. 60/748,988, filed Dec. 9, 2005, which is incorporated herein by reference. This Patent Application is related to U.S. patent application Ser. Nos. 11/637,954, 11/637,964, 11/637,514, 11/637,316, to Taylor, et al., respectively entitled HIGH LEVEL NETWORK LAYER SYSTEM AND METHOD, MESSAGE HISTORY DISPLAY SYSTEM AND METHOD, EVENT NOTIFICATION SYSTEM AND METHOD, and CONTACT LIST DISPLAY SYSTEM AND METHOD, filed concurrently herewith and incorporated by reference herein.

BACKGROUND

Instant messaging requires the use of a client program that hooks up an instant messaging service and differs from e-mail in that conversations are then able to happen in real time. Most services offer a presence information feature, indicating whether people on one's list of contacts are currently online and available to chat. This may be called a contact list. In early instant messaging programs, each letter appeared as it was typed, and when letters were deleted to correct typos this was also seen in real time. This made it more like a telephone conversation than exchanging letters. In modern instant messaging programs, the other party in the conversation generally only sees each line of text right after a new line is started. Most instant messaging applications also include the ability to set a status message, roughly analogous to the message on a telephone answering machine.

Popular instant messaging services on the public Internet include .NET Messenger Service, AOL Instant Messenger, Excite/Pal, Gadu-Gadu, Google Talk, iChat, ICQ, Jabber, Qnext, QQ, Meetro, Skype, Trillian and Yahoo! Messenger. These services owe many ideas to an older (and still popular) online chat medium known as Internet Relay Chat (IRC).

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for image provisioning in an instant messaging (IM) environment involves storing images on a web server. A system according to the technique may comprise a high level IM server that includes an image provisioning engine, an application server that includes one or more images. In operation, the high level IM server may be coupled to a low level IM server and a web server serves an image to the low level IM server (or inserts the image into an instant message) in response to an image provisioning stimulus.

An example of a method according to the technique may comprise making one or more custom emoticons available via a web server; receiving an indication from a first IM client that a custom emoticon of the one or more custom emoticons is to be included in an instant message; and providing from the web server the custom emoticon, in association with the instant message, to a second IM client. Another example of a method according to the technique may comprise displaying a first avatar image in an IM environment; receiving an avatar transition stimulus; and transitioning to a second avatar image in response to the avatar transition stimulus.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
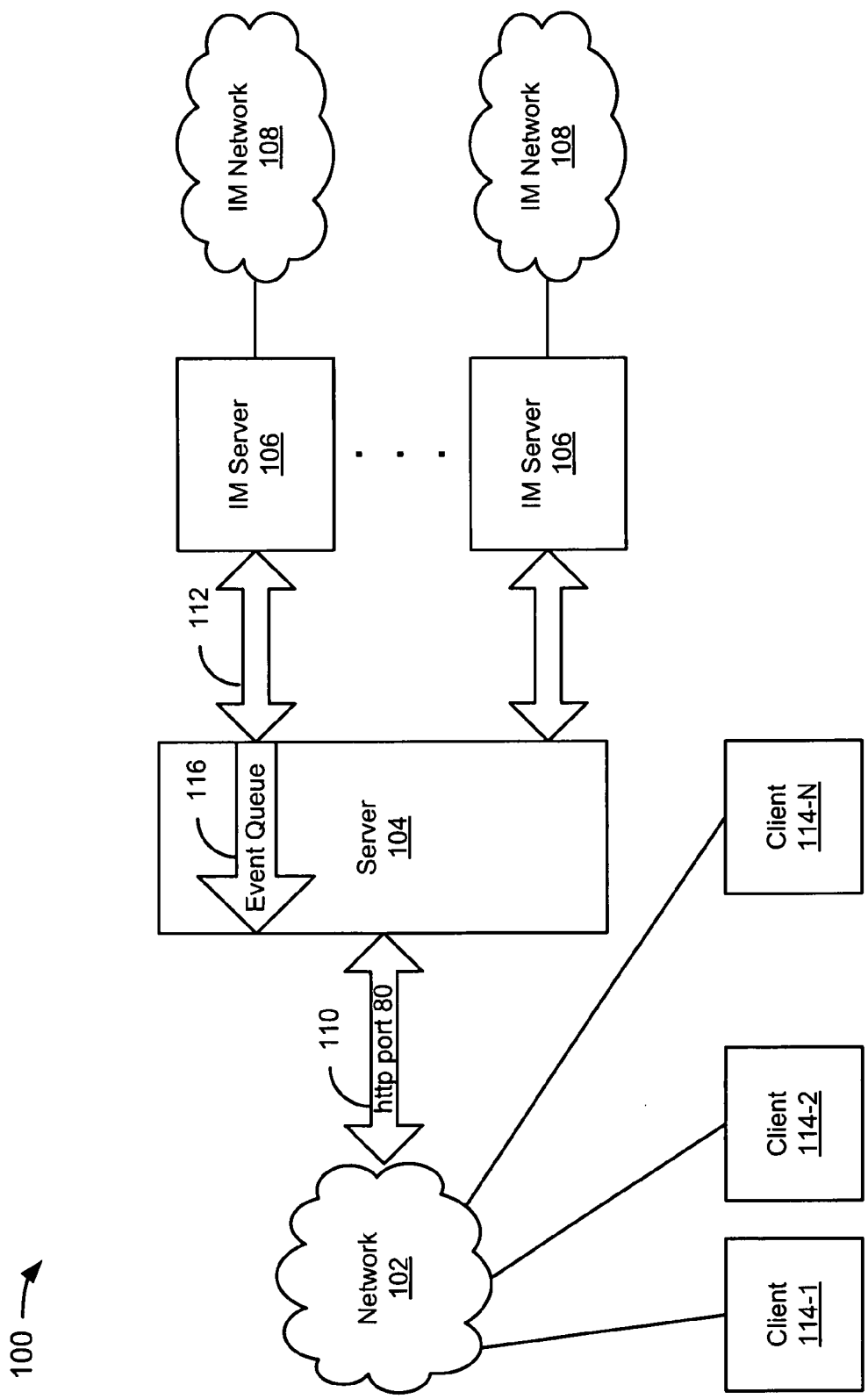
FIG. 1 depicts an example of a system for providing instant messages to clients via a web interface.

FIG. 1 depicts an example of a system 100 for providing instant messages to clients via a web interface. In the example of FIG. 1, the system 100 includes a network 102, a server 104, and an Instant Messenger (IM) server 106, and an IM network 108. The server 104 is coupled to the network at least by way of port 80. The two way communication via port 80 is represented in the example of FIG. 1 as an arrow 110. The server 104 is coupled to the IM server 106 via one or more other ports. The two way communication via the other ports is represented in the example of FIG. 1 as an arrow 112. The IM server 106 is coupled to the IM network 108 via any known or convenient mechanism. Indeed, the IM server 106 may be thought of as part of the IM network 108. The network 102 couples a plurality of clients 114-1 to 114-N (referred to collectively as clients 114) to the server 104. In the example of FIG. 1, the server 104 includes an event queue 116.

The network 102 may include by way of example but not limitation LAN, WAN, VLAN, WLAN, Internet, cellular network, phone network, radio network, or some other known or convenient network. The term "Internet" as used herein refers to a network of networks that uses certain protocols, such as TCP/IP, and possibly other protocols such as the hypertext transfer protocol (HTTP) for hypertext markup language (HTML) documents that make up the World Wide Web (the web). The physical connections of the Internet and the protocols and communication procedures are well known, but any convenient physical connections or protocols could be used.

The server 104 may include a multiple servers. Indeed, it may be desirable, depending upon details of a particular implementation, to install several servers to cope with the number of simultaneous users the system 100 supports. It may further be desirable, depending upon details of a particular implementation, for the server 104 to have a high CPU throughput, together with large amounts of RAM, to handle a large number of users. It may further be desirable, depending upon details of a particular implementation, to accomplish resource sharing via thread handling where a pool of threads is shared and used by one or more of the clients 114 for client-server communication and between the server 104 and the IM server 106.

The server 104 may include one or more of an application server, database server, web server, banners server, and content server, or any combination thereof. To make the most of the techniques described herein, the server 104 should, though is not required to, include at least one application server. The other servers can have supporting roles in, by way of example but not limitation, serving static content or advertising (e.g., banners), storing usage data, or fulfilling some other known or convenient function.

The server 104 may act as a proxy server between the clients 114 and the IM server 106. The server 104 receives communications from the clients 114 on http port 80, and responds to the clients 114 on http port 80. Communications from the clients 114 that are bound for the IM network 108, however, must also come through http port 80 to the server 104, and are then forwarded to the IM server 106. In this way, the server 104 acts as a carrier of the data from users to the IM network 108 using a mechanism that controls and manages the data (e.g., text messages, display images, emoticons, audio/video streams, etc.) sent between one of the clients 114 and the server 104, and vice versa.

The IM server 106 may be any known or convenient IM server that is compatible with IM. Events, messages, or other appropriate data from the IM server 106 are collected in the event queue 116 of the server 104. The events may be collected in association with a variety of protocols including by way of example but not limitation port 1863, port 5050, port 5222, port 5190, etc.

The IM network 108 may include one or a combination of networks selected from MSN Messenger, Yahoo! Messenger, AIM AOL, ICQ, QQ, Jabber, Google Talk, IRC, or some other known or convenient IM network.

The clients 114 may include any known or convenient device, including by way of example but not limitation, a Web browser, mobile client, PDA, game console, TV box, native application, etc. The clients poll the server 104 for events. The events can be removed from the event queue 116 and translated into text, JavaScript, XML, or some other known or convenient format that one or more of the clients 114 need or expect in order to process data associated with the event.

To interact with the IM network 108, the clients 114 send data to the server 104. The data, which may include commands, is processed and translated into corresponding data that will be sent to the appropriate IM network. In an embodiment, the appropriate IM network may be determinable based upon the protocol encoded in a message.

Messages or actions from the clients 114 are collected over network protocols such as, by way of example but not limitation, HTTP or plain socket connections. The messages or actions are transformed to an appropriate protocol format to be sent over a compliant port from the clients 114 to the server 104, with the IM protocol on the application side. In a non-limiting embodiment, the compliant port is http port 80. However, any port having similar characteristics to those of a typical port 80 could be used.

The latest available browsers, as of December 2005, enable the use of a technique called AJAX (Asynchronous JavaScript And XML). With AJAX, appropriately configured clients 114 can execute actions and poll for messages or events using only JavaScript. The method is based on using an XMLHttpRequest object to make HTTP requests to the server 104. The server 104 may reply with messages taken from the queue of the corresponding session in XML (or another) format that are parsed and displayed according to the message content.

For clients 114 that include a browser, when accessing the server 104 the browser typically uses hidden HTML frames to update information on visible frames. The visible frames display appropriate information while the hidden frames are reloaded in short periods of time. In each refresh that hits the server 104, the browser identifies the current messaging session and checks if new events or messages associated with the session are in the event queue 116. When new information arrives and needs to be displayed in some form, the browser makes use of, for example, JavaScript code to update the visible frames and windows with new messages or events keeping the information up to date in the screen. In this way, automatic refreshing can take place in a hidden frame.

In another embodiment, certain of the clients 114 with browsers may not make use of refreshes. For example, a form of updating the screen without using a refresh technique is to keep one single HTTP socket request alive for the whole period of a messaging session without actually closing the socket connection. In this example, information is initially loaded and displayed in one single visible frame. While events and messages are being received by the server 104, JavaScript code can be injected into the HTML document through the same HTTP socket kept alive and managed by the server 104. For each event or message, the browser can interpret the JavaScript code injected and the corresponding parts of the HTML document and windows will be updated.

In another embodiment, certain of the clients 114 with browsers may make use of manual refreshes. Some relatively unsophisticated browsers, such as WAP and xHTML browsers often available on mobile phones, do not support hidden frames and/or JavaScript (and others may be configured such that they do not support hidden frames and/or JavaScript). In such cases, the information displayed has to be updated manually by the user. Manual updating enables any mobile phone, PDA, TV Set or any device with a browser to connect to the server 104 and use the messaging platforms made available by the server 104 assuring the communication between the clients 114 and the IM server 106.

Message history can be stored by most IM clients on a local computer. For alternative web and mobile-based clients local storage may not be possible. In a non-limiting embodiment, the server 104, may have the capability to store message history from IM conversations done via one or more of the clients 114. The message history can be accessed and searched at any time via the server 104 by one or more of the clients 114

Figure 2:
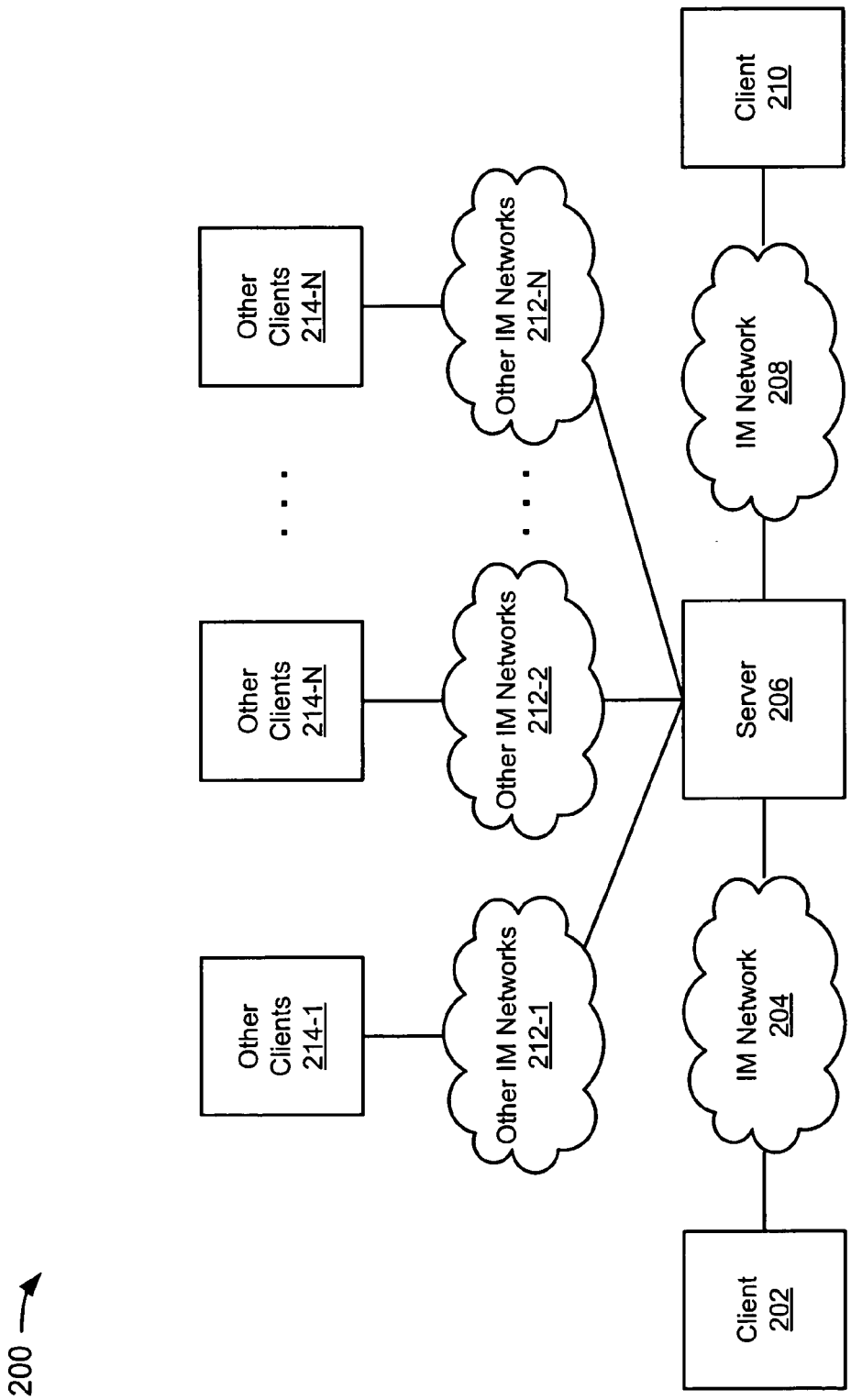
FIG. 2 depicts an example of a system for displaying content from an IM client at an alternative IM client.

FIG. 2 depicts an example of a system 200 for displaying content from an IM client at an alternative IM client. In the example of FIG. 2, the system 200 includes a client 202, an IM network 204, a server 206, an IM network 208, a client 210, other IM networks 212-1 to 212-N (referred to collectively as other IM networks 212), and other clients 214-1 to 214-N (referred to collectively as other clients 214).

For illustrative purposes, it is assumed that the client 202 has content that is compatible with the IM network 204. However, the client 210 is capable of reading content formatted to be compatible with the IM network 208. Thus, in operation, the server 206 collects content from the client 202 (either through the IM network 204, as shown in FIG. 2, or directly from the client 202, such as is shown by way of example in FIG. 1). The server 206 then formats the content as appropriate for use on the IM network 208. Once the content is properly formatted, it can be made available to the client 210 (either through the IM network 208, as shown in FIG. 2, or directly to the client 210, such as is shown by way of example in FIG. 1). Depending upon the embodiment and/or implementation, the content may also be formatted as appropriate for one or more of the other IM networks 212, to be made available for one or more of the other clients 214.

In an embodiment, the server 206 can save the content in one or many formats. In this way, the client 202 could make content available in a first IM format, the server 206 could convert the content into a second IM format, and the server 206 can save the content in at least the second IM format. Thus, the client 210 could receive the data in the second IM format. The server 206 could easily store the content in the first IM format, as well, and make the content available to other clients coupled to the IM network 204. In addition, the server 206 could convert the content to other IM formats, such as those formats that are associated with the other IM networks 212, and save the other IM formats. In this way, the other clients 214 may have access to the content.

The capability of the server 206 to store content in a particular format can be particularly advantageous in specific cases. Consider that standard emoticons can be identified by a character sequence that is universally recognized in a particular IM network. When the client 202 wishes to send an emoticon to the client 210, a user at the client 202 may type in a character string that is associated with an emoticon. For example, the character string ":)" is associated with the emoticon: "☺." When the client 210 receives the character string, the client 210 translates the string into the appropriate emoticon for display in the instant message. However, custom emoticons have to be sent as an image from the client 202 to the client 210 because the client 210 cannot interpret the custom emoticons of the client 202. This is where the capabilities of the server 206 to store content become advantageous.

The client 202 may be incapable of sending images in an instant message for a number of reasons. For example, the client 202 may simply be unable to store images that can be included in an instant message. As another example, the client 202 may have no storage space remaining to store images. As another example, the client 202 may have used up all of the storage that is allotted to custom emoticons. Alternatively, it may simply be desirable to store images at some location other than the client 202 to avoid the memory allocation issues entirely (or for other reasons).

Advantageously, the server 206 can store custom emoticons for the client 202, and automatically insert the custom emoticons into messages when the message includes a string of characters that is associated with the emoticon.

The client 210 may have limitations, as well. For example, a custom emoticon is typically sent as an image (since the receiving client is presumed to be unable to interpret the string of characters associated with the custom emoticon, and insert an image locally instead). Thus, the image has to be stored at the client 210. However, in some cases, the client 210 is unable to store locally (or the custom emoticons may be unreadable at the client 210), so the custom emoticons have to be made available via the server 206.

The server 206 may therefore be responsible for transferring custom emoticons between the clients and making them available via web server, if applicable. In this way, the system 200 can facilitate sending and receiving custom emoticons.

FIGS. 3A-3E depict a screenshots of an avatar that changes over time. In the example of FIGS. 3A-3E, avatars are assumed to have a pre-defined size. The reason for a pre-defined size is that most IM networks provide for a pre-defined size for avatars. In some implementations, a layer on top of IM networks could change the allowed size and shape of the avatar representations. However, the custom avatars may not be compatible with the underlying IM network avatar specifications.

Figure 3A:
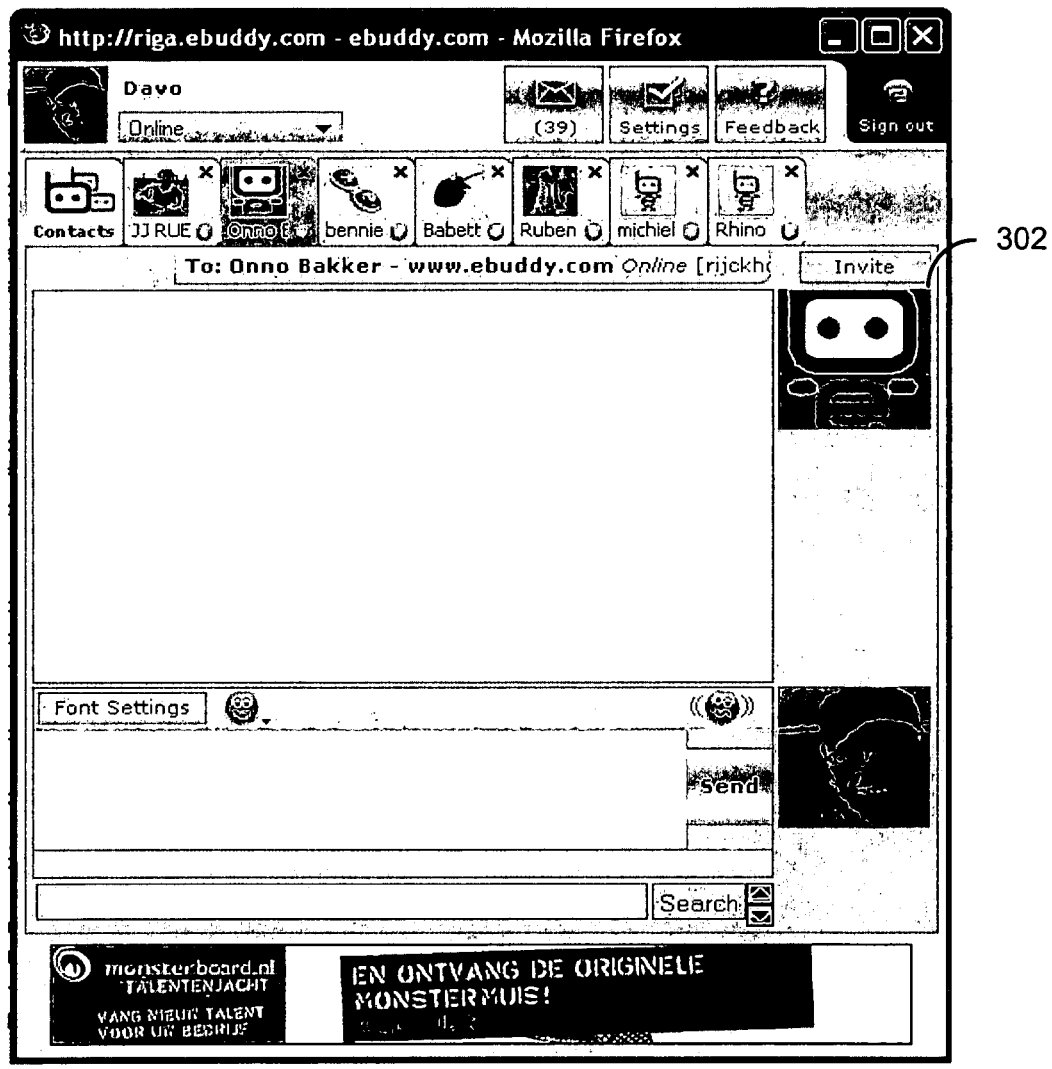
FIGS. 3A-3E depict screenshots of an avatar that changes over time.

In the example of FIG. 3A, the screenshot 300A includes an avatar 302. (The screenshot includes other avatars that could be configured to change over time, but only the avatar 302 is going to be described herein as changing over time.) The avatar 302 is a picture of eBuddy's trademarked robot.

Advantageously, the layer on top of the IM networks could provide multiple avatars for the same user. Assume, for example, that the user associated with the avatar 302 (of the eBuddy robot) has avatars that he likes to represent. The first avatar 302 could rotate to some other avatar. For example, in the example of FIG. 3B, the screenshot 300B includes an avatar 304 that is transitioning from the avatar 302 (FIG. 3A) to a new avatar.

Figure 3B:
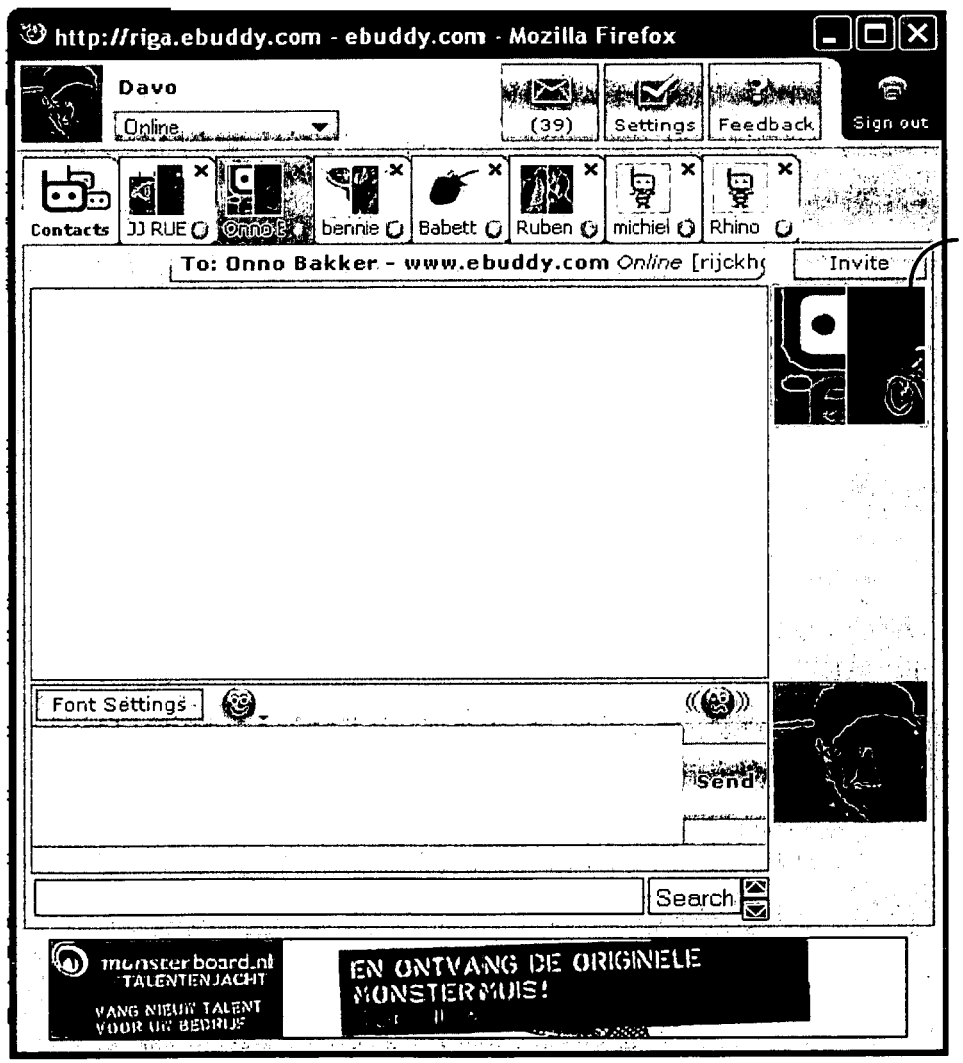
Figure 3C:
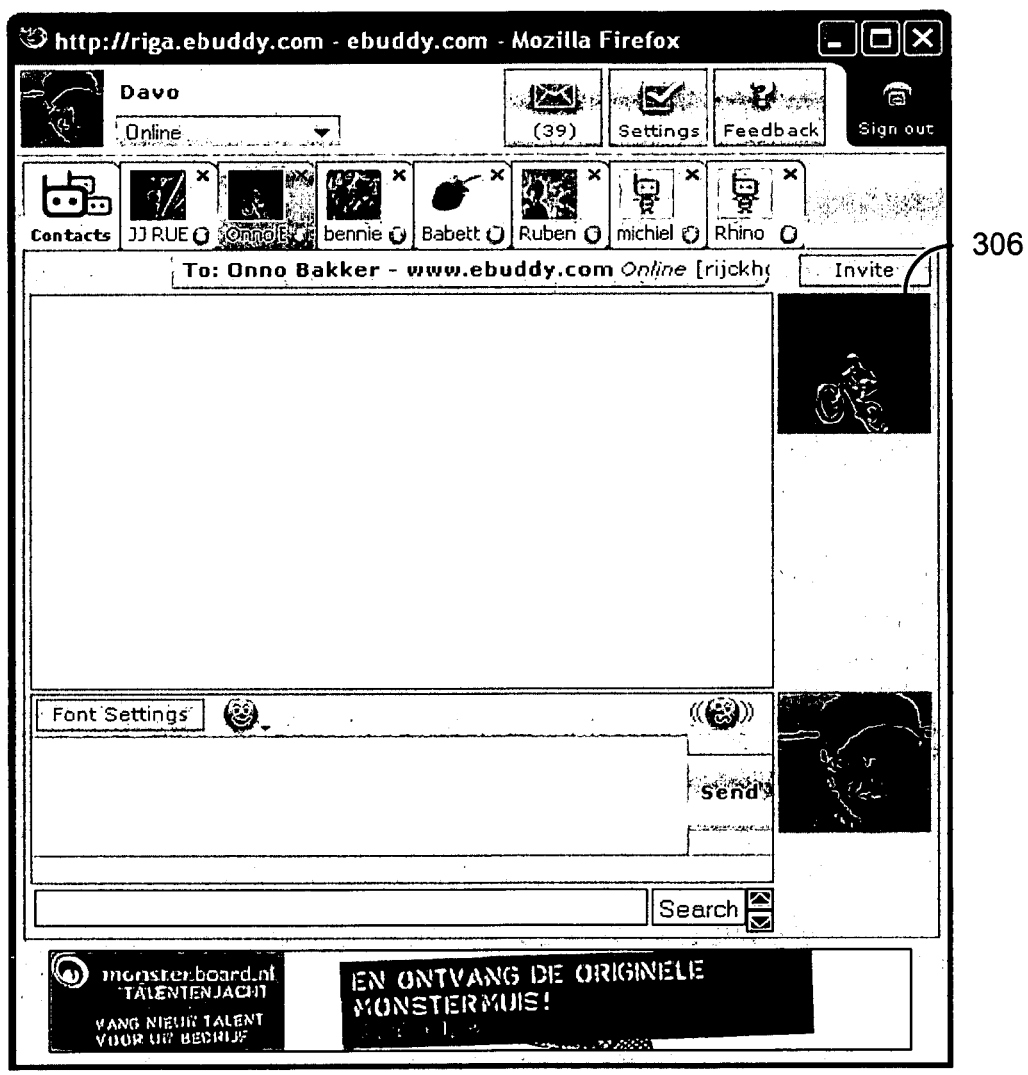

In the example of FIG. 3C, the screenshot 300C includes an avatar 306 (of an airborne bicyclist) to which the avatar 302 was transitioning in FIG. 3B. The user associated with the avatar 302 (FIG. 3A) and the avatar 306 could have an implementation-specified limit (or practical limit if there is no specified limit) on the number of avatars between which transitioning is facilitated. The number of avatars is referred to herein as an avatar bundle.

One type of avatar bundle includes an "avatar carousel," which facilitates rotation between avatar options over time. Avatars may instead be randomly selected from the avatar bundle in a "random avatar carousel," or selected based upon environmental factors (in a "location aware avatar carousel"), such as detected location, cell phone settings, or some other environment variable. Avatar bundles could include combinable images, as well. For example, an avatar bundle could include images that are combinable with text, such as a location or local time. So, for example, if a user is in San Francisco, the avatar may be displayed with the text "in San Francisco" across the bottom portion of the image.

Figure 3D:
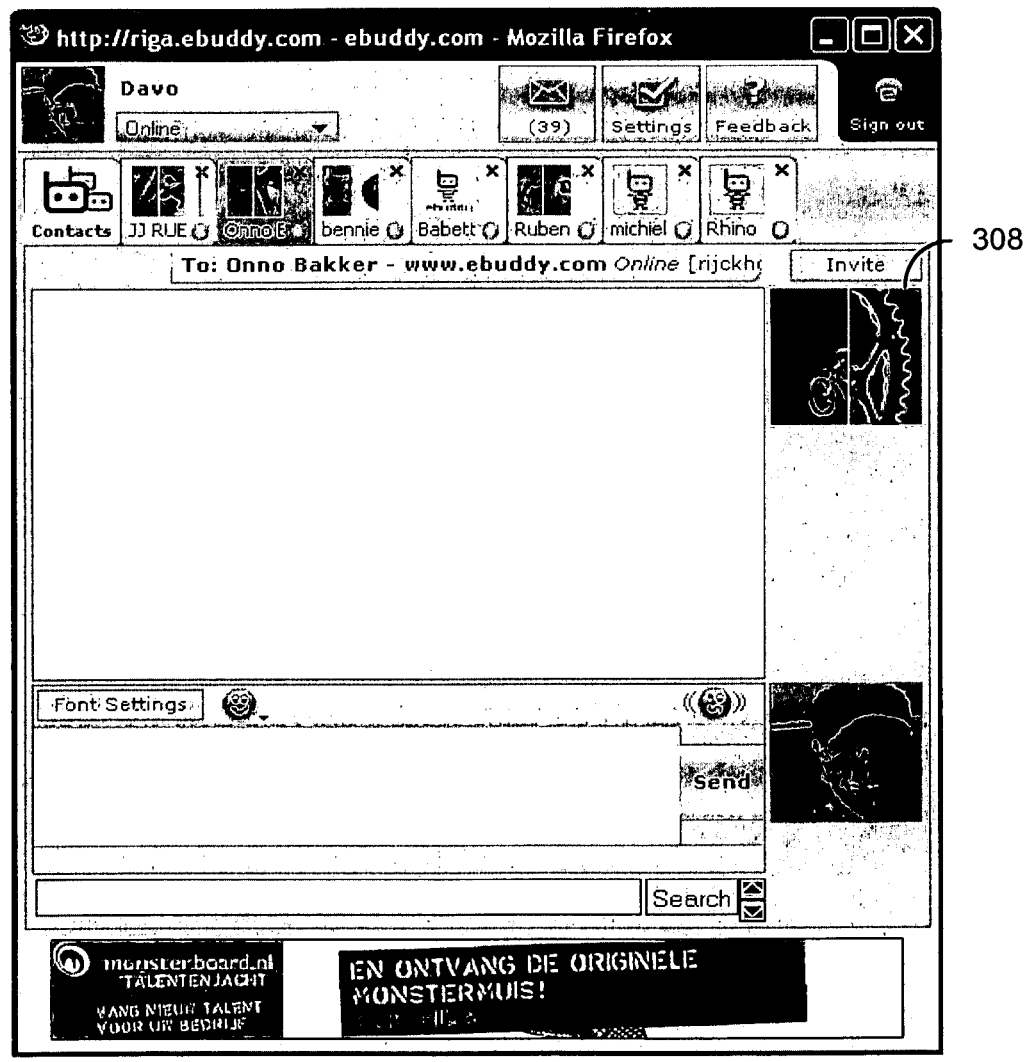
Figure 3E:
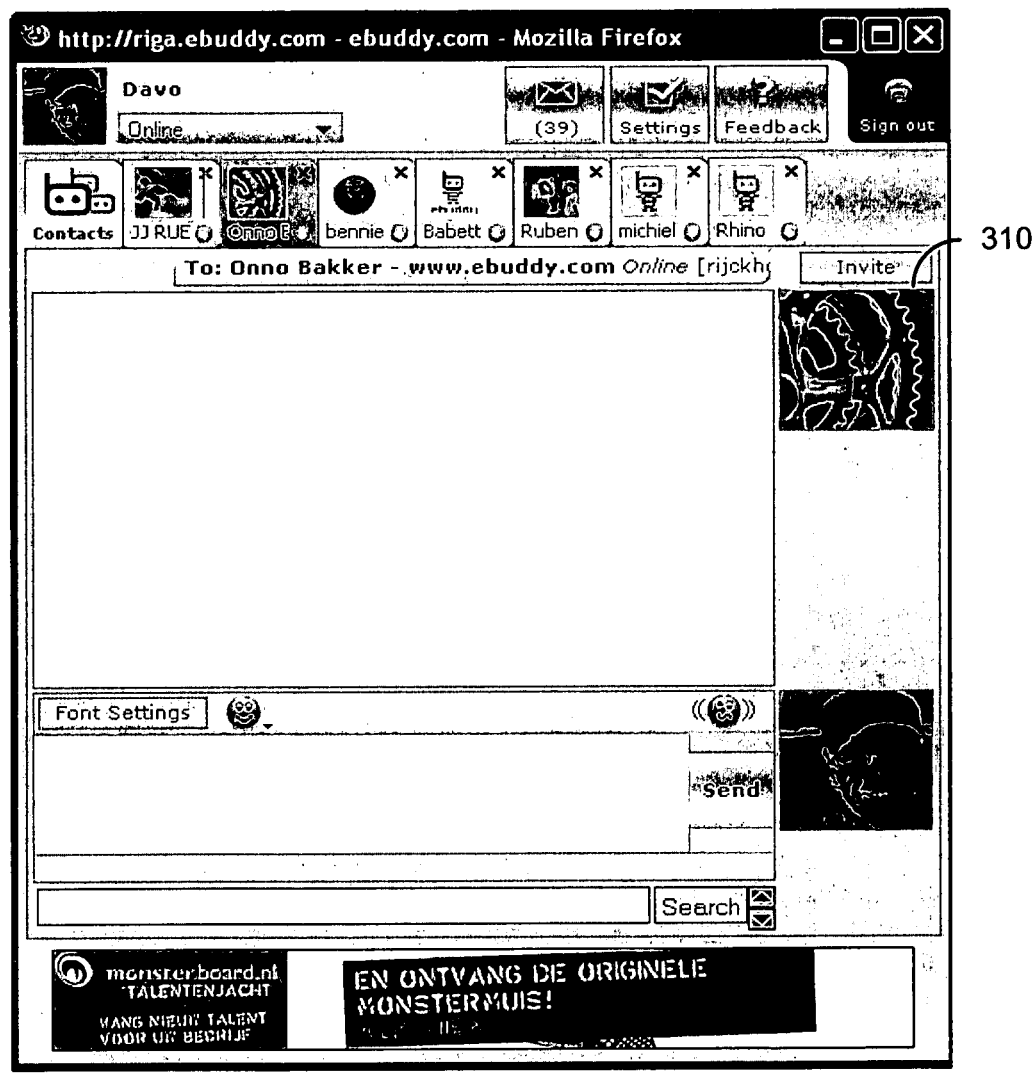

In the example of FIG. 3D, the screenshot 300D includes an avatar 308 that is transitioning from the avatar 306 (FIG. 3C) to a new avatar. In the example of FIG. 3E, the screenshot 300E includes an avatar 310 to which the avatar 306 was transitioning in FIG. 3D.

Figure 4:
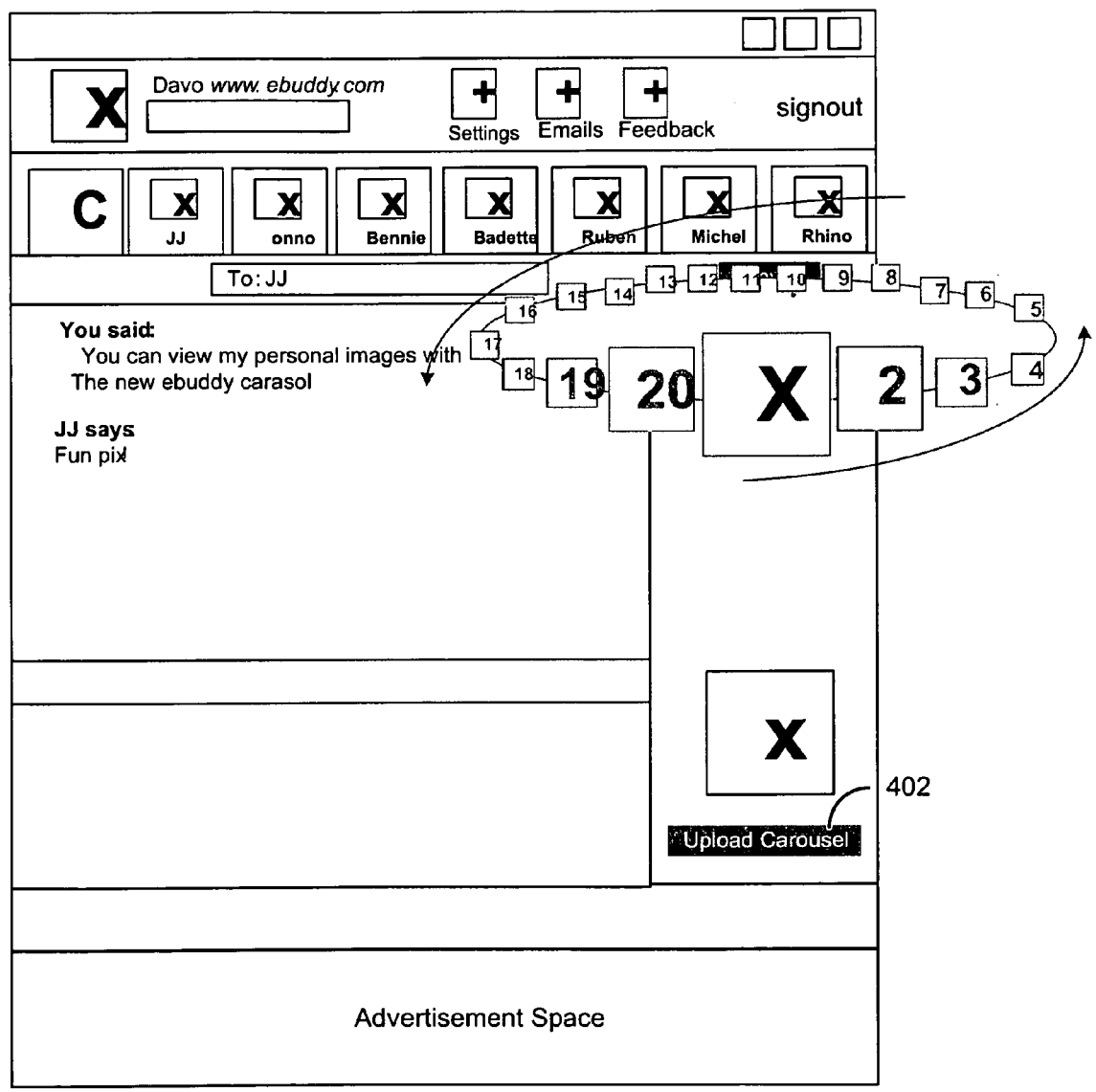
FIG. 4 depicts a conceptual diagram of an avatar carousel.

FIG. 4 depicts a conceptual diagram 400 of an avatar carousel. In the example of FIG. 4, 20 images are on the carousel, though this is an implementation-specific and/or configurable number. In the examples of FIG. 3A-3E, the image transitions slide in from the right, though the transition could be accomplished in any manner, depending upon implementation and/or configuration. The conceptual diagram 402 includes an upload carousel button 402. In an embodiment, a user can open an upload dialog with the button, and upload images. There may be an implementation-specific limit on the number of images that can be uploaded. Of course, if only one image is uploaded, the image would not change over time (or due to other factors, such as location, day of the week, etc.).

Figure 5:
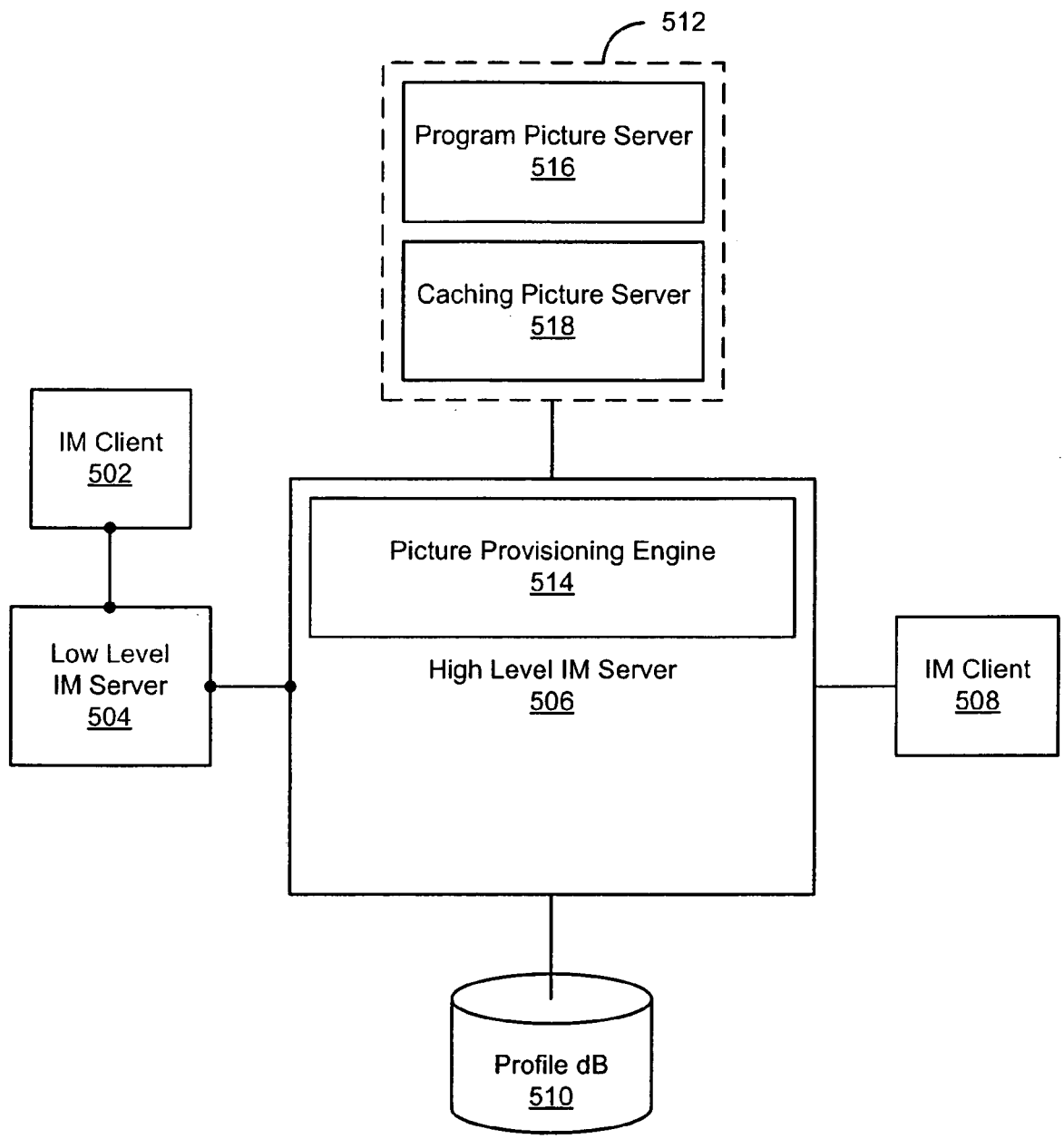
FIG. 5 depicts an example of a system capable of avatar provisioning in an avatar bundle.

FIG. 5 depicts an example of a system 500 capable of avatar provisioning using an avatar bundle. The system 500 includes an IM client 502, a low level IM server 504, a high level IM server 506, an IM client 508, a profile database 510, and an application server 512.

The IM client 502 may include any known or convenient device capable of functioning as a client in an IM environment, including by way of example but not limitation, a Web browser, mobile client, PDA, game console, TV box, native application, etc. The IM environment may include, by way of example but not limitation, MSN Messenger, Yahoo! Messenger, AIM AOL, ICQ, QQ, Jabber, Google Talk, IRC, etc.

The low level IM server 504 may include any known or convenient device capable of functioning as a server in an IM environment. In the example of FIG. 5, the client 502 is coupled to the IM server 504 via a socket connection.

The high level IM server 506 may include any known or convenient device capable of functioning as a layer (or layers) on top of an IM environment. In the example of FIG. 5, the low level IM server 504 is coupled to the high level IM server 506 via a socket connection. The high level IM server 506 includes a picture provisioning engine 514.

The picture provisioning engine 514 uses stimuli provided through the low level IM server 504 (e.g., from the IM client 502), from the IM client 508, read from the profile database 510, or provided from the application server 512, to determine what images to provide for display on the IM client 502. Stimuli may include, by way of example but not limitation, presence at the IM client 508, location associated with the IM client 508, a character string received from the IM client 508, any characteristics of the IM client 508 represented in the profile database 510, an internal timer at the picture provisioning engine 514, etc. When the picture provisioning engine 514 determines that an image is to be provided, the application server 512 makes the image available. In an embodiment, the image is provided through the high level server 506 (e.g., by inserting the image into a data stream to the low level server 504). In another embodiment, the image is provided from the application server 512 directly to the low level server 504, the IM client 502, or the IM client 508.

The IM client 508 may include any known or convenient device capable of functioning as a client in an IM environment. The IM client 508, for illustrative purposes, is coupled to the high level IM server 508. It may be noted that the IM client 508 may have access to higher level functionality (from the high level IM server 506) than the client 502. However, at least some of the techniques described herein are applicable to low level IM clients (where the low level IM server(s) of the low level IM clients is coupled to a high level IM server).

The profile database 510 is embodied in a computer-readable medium, either on the high level IM server 508 or on some other device. The profile database 510 may or may not include a number of fields that are maintained on a per-login basis. The fields may include, by way of example but not limitation, a hash code, time (e.g., dd/mm/yyyy hh:mm:ss), user ID, Email address, IP address, refer site (i.e., the site from which a user is referred), type (e.g., mobile, web, version type, etc.), country, sent (e.g., number of messages sent), received (e.g., number of messages received), contacts (e.g., number of contacts in buddy list), sessions (e.g., number of chat sessions during this login), duration (e.g., duration of login in seconds), successful (e.g., 1 or 0, connected to MAS or Yahoo!, AOL database), user agent (e.g., browser type, language, mobile phone model, etc.). In an embodiment, the profile database includes a presence field that is associated with a user's location.

The application server 512 may include one or more known or convenient types of servers. In the example of FIG. 5, the application server 512 includes a program picture server 516 and a caching picture server 518. The application server 512 may include many server systems. The program picture server 516 includes avatars associated with the IM client 508. The caching picture server 518 may include avatars associated with the IM client 502, the IM client 508, and/or any other IM clients. After an implementation-specific period of time, the caching picture server 518 deletes the avatars to make room for additional avatars. However, the program picture server 516, for the convenience of, for example, members of an IM network associated with the high level IM server 506, maintains avatars in storage for use by particular clients.

The IM client 508 may be allocated a limited amount of space on the program picture server 516 in which to store avatars. The high level IM server 506 can facilitate display of the avatars in a manner that is implementation-specific and/or as requested by a member associated with the IM client 508.

In the example of FIG. 5, in operation, it is assumed that the IM client 502 and the IM client 508 are engaged in instant messaging. The IM client 502 is limited by the capabilities of the low level IM server 504. Since the IM client 508 is IMing with the IM client 502, the IM client 508 is, at least in part, similarly limited. For example, the low level IM server 504 may limit the characteristics of instant messages and avatars. In order for the messages and avatar of the IM client 508 to be readable by the IM client 502, the messages and avatar must meet these limitations. However, the high level IM server 506 can automatically update, for example, an avatar of the IM client 508 in a manner that was described above with reference to FIGS. 3-4. Since each instance of a changing avatar does not violate the low level IM network rules, the change can be observed by the IM client 502.

Moreover, the IM client 508 can have a number of custom emoticons stored in the application server 512. The IM client 508 can send these custom emoticons as pictures to the IM client 502. Indeed, the high level IM server 506 could standardize the custom emoticons for high level IM users. Thus, the "custom emoticons" would appear to low level IM users as custom emoticons, but would be generally available to members of the high level IM network. Custom emoticons that are standardized for high level IM users may be referred to as "pseudo-custom" emoticons.

Although the IM client 502 may be unable to send the custom emoticons, the IM client 502 should be able to receive the custom emoticons from the IM client 508 because all popular IM networks enable the display of small images in instant messages. Moreover, the IM client 502 could be taught the character strings associated with the custom (or pseudo-custom) emoticons and use the character strings when responding to the IM client 508. Of course, this functionality would be limited to messages that pass through the high level IM server 506.

Figure 6:
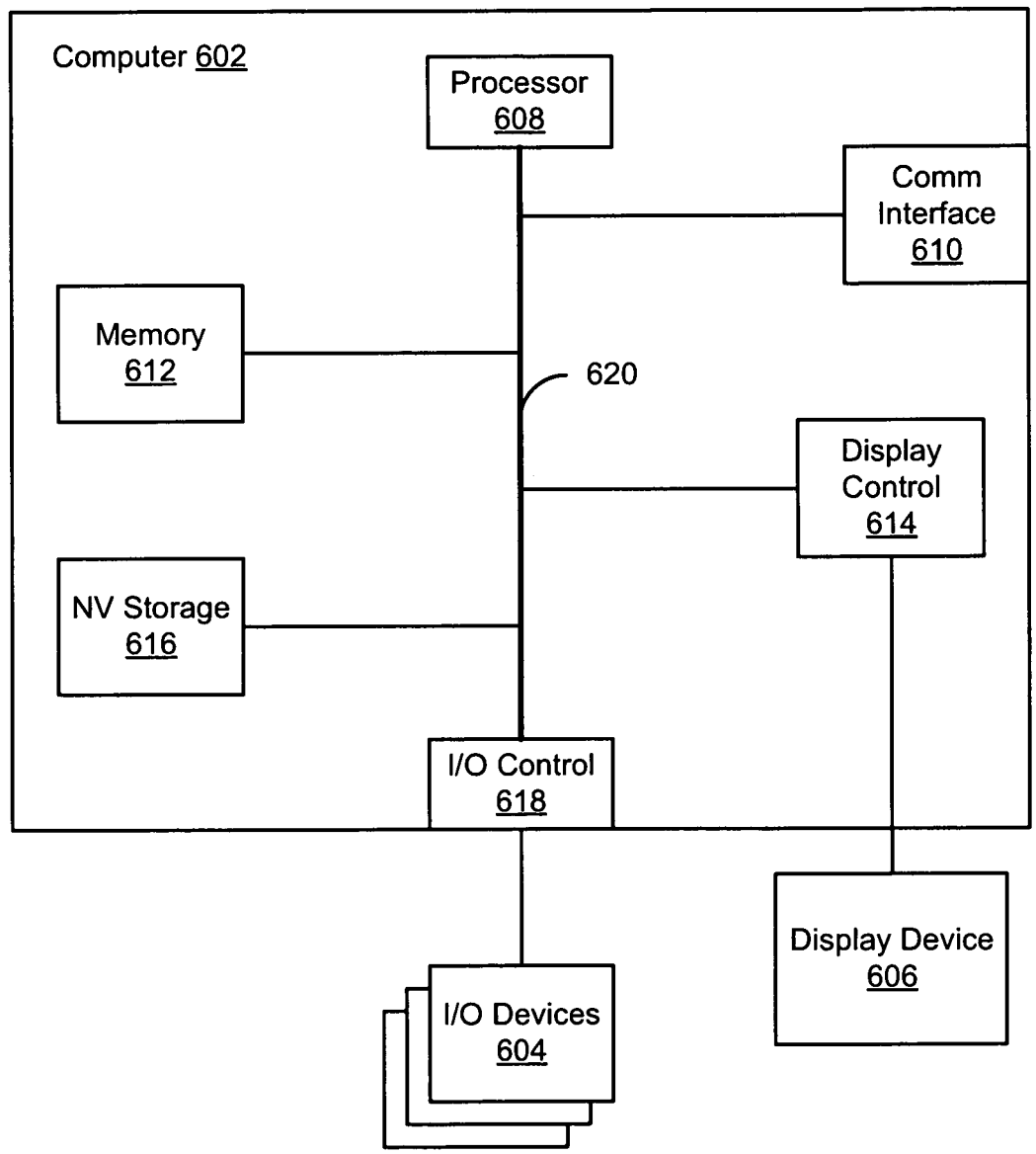
FIG. 6 depicts a computer system suitable for implementation of the techniques described with reference to FIGS. 1-5.

FIG. 6 depicts a computer system 600 suitable for implementation of the techniques described above with reference to FIGS. 1-5. The computer system 600 includes a computer 602, I/O devices 604, and a display device 606. The computer 602 includes a processor 608, a communications interface 610, memory 612, display controller 614, non-volatile storage 616, and I/O controller 618. The computer 602 may be coupled to or include the I/O devices 604 and display device 606.

The computer 602 interfaces to external systems through the communications interface 610, which may include a modem or network interface. The communications interface 610 can be considered to be part of the computer system 600 or a part of the computer 602. The communications interface 610 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 610 optional in the strictest sense of the word.

The processor 608 may include, by way of example but not limitation, a conventional microprocessor such as an Intel Pentium microprocessor or Motorola power PC microprocessor. While the processor 608 is a critical component of all conventional computers, any applicable known or convenient processor could be used for the purposes of implementing the techniques described herein. The memory 612 is coupled to the processor 608 by a bus 620. The memory 612, which may be referred to as "primary memory," can include Dynamic Random Access Memory (DRAM) and can also include Static RAM (SRAM). The bus 620 couples the processor 608 to the memory 612, and also to the non-volatile storage 616, to the display controller 614, and to the I/O controller 618.

The I/O devices 604 can include a keyboard, disk drives, printers, a scanner, and other input and output devices, including a mouse or other pointing device. For illustrative purposes, at least one of the I/O devices is assumed to be a block-based media device, such as a DVD player. The display controller 614 may control, in a known or convenient manner, a display on the display device 606, which can be, for example, a cathode ray tube (CRT) or liquid crystal display (LCD).

The display controller 614 and I/O controller 618 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 616, which may be referred to as "secondary memory," is often a magnetic hard disk, an optical disk, or another form of storage for large amounts of data. Some of this data is often written, by a direct memory access process, into memory 612 during execution of software in the computer 602. The non-volatile storage 616 may include a block-based media device. The terms "machine-readable medium" or "computer-readable medium" include any known or convenient storage device that is accessible by the processor 508 and also encompasses a carrier wave that encodes a data signal.

The computer system 600 is one example of many possible computer systems which have different architectures. For example, personal computers based on an Intel microprocessor often have multiple buses, one of which can be an I/O bus for the peripherals and one that directly connects the processor 608 and the memory 612 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 612 for execution by the processor 608. A Web TV system, which is known in the art, is also considered to be a computer system, but it may lack some of the features shown in FIG. 6, such as certain input or output devices. A typical computer system will usually include at least a processor, memory, and a bus coupling the memory to the processor.

The computer system 600 may be controlled by an operating system (OS). An OS is a software program—used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

Figure 7:
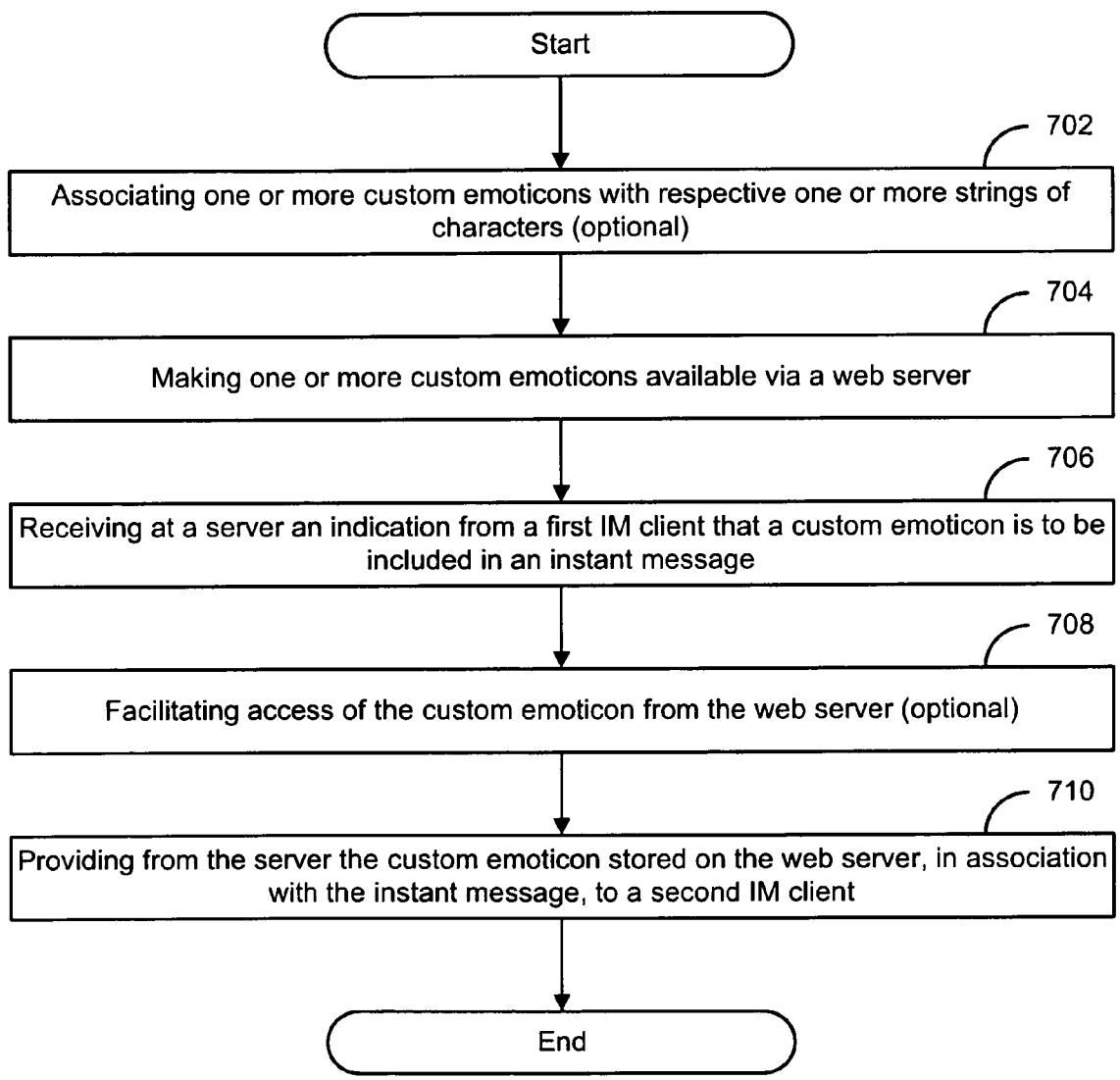
FIG. 7 depicts a flowchart of an example of a method for custom emoticon provisioning.

FIG. 7 depicts a flowchart 700 of an example of a method for custom emoticon provisioning. This method and other methods are depicted as serially arranged modules. However, modules of the methods may be reordered, or arranged for parallel execution as appropriate. In the example of FIG. 7, the flowchart 700 begins at optional module 702 where one or more custom emoticons are associated with respective one or more strings of characters. The custom emoticon may be thought of as an image and the associated string of characters in that a first IM user may input the string of characters and a second IM user may receive the image.

In the example of FIG. 7, the flowchart 700 continues to module 704 where the one or more custom emoticons are made available via a web server. This is advantageous because even clients that normally could not handle custom emoticons can access the one or more custom emoticons via the web server. Also, or alternatively, an IM client that is associated with a custom emoticon that is available via the web server need not store the custom emoticon locally.

In the example of FIG. 7, the flowchart 700 continues to module 706 where an indication is received at a server (e.g., a high level IM server) from a first IM client that a custom emoticon is to be included in an instant message. The web server could simply replace a string of characters with the image. However, as has been mentioned, since the web server is making the custom emoticon available, the string of characters could instead be replaced with a link to the web server.

In the example of FIG. 7, the flowchart 700 continues to optional module 708 where access of the custom emoticon from the web server is facilitated at the second IM client. The module is optional because it is not necessary to facilitate access if the emoticon image has already been inserted into the instant message.

In the example of FIG. 7, the flowchart 700 continues to module 710 where the custom emoticon is provided from the web server, in association with the instant message, to a second IM client. Depending upon the implementation, this may include providing an image of the custom emoticon or providing a link to the custom emoticon.

Figure 8:
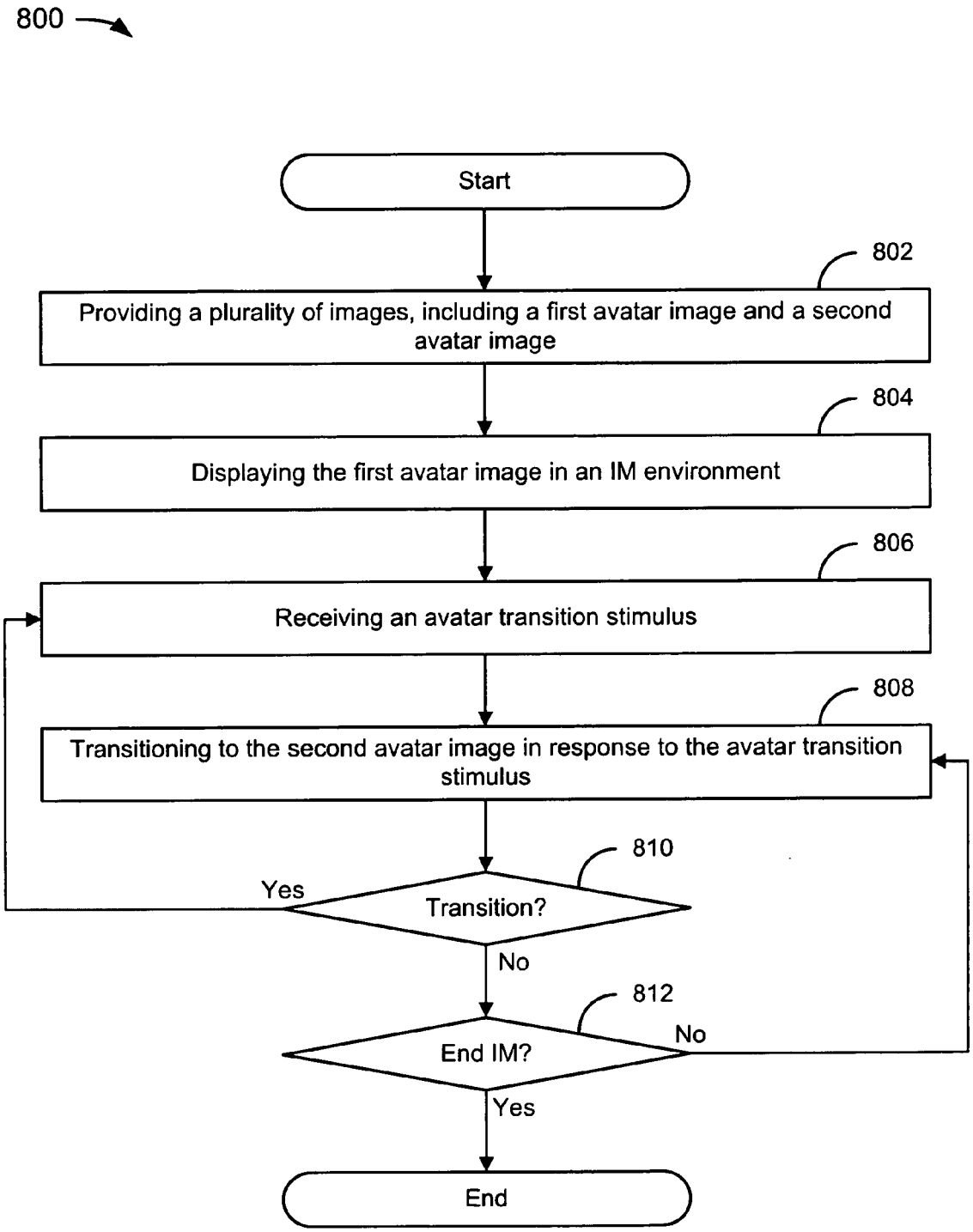
FIG. 8 depicts a flowchart of an example of a method for avatar bundle provisioning.

FIG. 8 depicts a flowchart 800 of an example of a method for avatar bundle provisioning. In the example of FIG. 8, the flowchart 800 starts at module 802 where a plurality of images, including a first avatar image and a second avatar image, are provided.

In the example of FIG. 8, the flowchart 800 continues to module 804 where the first avatar image is displayed in an IM environment. An IM environment may include any known or convenient IM technology. The display of the image would typically be in a display window or panel of an IM client.

In the example of FIG. 8, the flowchart 800 continues to module 806 where an avatar transition stimulus is received. The avatar transition stimulus could include expiration of a periodic timer, change of presence, current location, etc. Depending upon the implementation, the avatar transition stimulus could include just about any stimulus that could be configured or otherwise associated with an IM client associated with the avatar.

In the example of FIG. 8, the flowchart 800 continues to module 808 where transitioning to the second avatar image in response to the avatar transition stimulus is done. In the example of FIG. 8, the flowchart 800 continues to decision point 810 where it is determined whether a transition is needed. If so (810-Y), the flowchart 800 continues from module 806, as described previously. If not (810-N), the flowchart 800 continues to decision point 812 where it is determined whether the IM ends (e.g., by one or both IM clients logging off). If so (812-Y), the flowchart 800 ends. If not (812-N), the flowchart 800 continues from module 808, as described previously.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
a processor and a memory;
a high level IM server including an image provisioning engine, wherein, in operation, the high level IM server is coupled to a plurality of low level IM servers comprising a first low level IM server associated with a first messaging service provider and a second low level IM server associated with a second messaging service provider;
a profile database coupled to the high level IM server, the profile database storing an aggregated messaging profile compatible with the first messaging service provider and the second messaging service provider;
a web server coupled to the high level IM server, wherein the web server includes one or more images;
wherein, in operation, the web server serves an image to the first low level IM server in response to an image provisioning stimulus;
wherein the image provisioning stimulus is responsive to a change of a presence state associated with a low level IM client connected to the first low level IM server;
an internal timer located inside the image provisioning engine, the internal timer providing a notification at a time interval;
wherein the image provisioning engine obtains the notification from the internal timer and generates the image provisioning stimulus based on the notification.

2. The system of claim 1 wherein the profile database is embodied in a non-transitory computer-readable medium, coupled to the high level IM server, wherein, in operation, a high level IM client is represented in the profile database when the high level IM client is connected to the high level IM server.

3. The system of claim 1, further comprising a program picture server that includes a plurality of avatars associated with an IM client, wherein, in operation, the image provisioning engine provides a first avatar of the plurality of avatars for display on a low level IM client connected to the first low level IM server in response to a first image provisioning stimulus, and the image provisioning engine provides a second avatar of the plurality of avatars for display on the low level IM client in response to a second image provisioning stimulus.

4. The system of claim 1, further comprising a program picture server that includes one or more emoticons associated with an IM client, wherein, in operation, the image provisioning engine provides an emoticon of the one or more emoticons for display on a low level IM client connected to the first low level IM server in response to an image provisioning stimulus.

5. The system of claim 1, wherein the image provisioning stimulus is provided through the first low level IM server.

6. The system of claim 1, wherein the image provisioning stimulus is provided through a low level IM client connected to the first low level IM server.

7. The system of claim 1, wherein the image provisioning stimulus is provided from a profile database connected to the high level IM server.

8. The system of claim 1, wherein the high level IM server comprises an application server configured to provide the image provisioning stimulus.

9. The system of claim 1, wherein the image provisioning stimulus is responsive to a change of a presence state associated with a low level IM client connected to the first low level IM server.

10. The system of claim 1, wherein the image provisioning stimulus is responsive to a character string received from a low level IM client connected to the first low level IM server.

11. The system of claim 1, further comprising:
a low level IM client connected to the first low level IM server, the low level IM client having a client characteristic;
wherein the profile database stores the client characteristic;
wherein the image provisioning engine obtains the client characteristic from the profile database and generates the image provisioning stimulus based on the client characteristic.

12. A method comprising:
configuring a connection to a first low level IM server associated with a first messaging service provider;
configuring another connection to a second low level IM server associated with a second messaging service provider;
adapting a computer readable medium to receive a plurality of images from a web server;
adapting the computer readable medium to access an aggregated messaging profile compatible with the first messaging service provider and the second messaging service provider;
configuring, in response to an image provisioning stimulus, the connection to the first low level IM server to send one of the plurality of images;
wherein the image provisioning stimulus is responsive to a change of a presence state associated with a low level IM client connected to the first low level IM server;
providing a notification at a time interval;
generating the image provisioning stimulus based on the notification.

13. The method of claim 12, wherein the image provisioning stimulus comprises a location of a low level IM client connected to the first low level IM server.

14. The method of claim 12, further comprising:
receiving a character string from a low level IM client connected to the first low level IM server;
generating the image provisioning stimulus based on the character string.

\* \* \* \* \*